(12) United States Patent  (10) Patent No.: US 8,173,286 B2
Marukawa et al.  (45) Date of Patent: May 8, 2012

(54) BATTERY PACK

(75) Inventors: Shuhei Marukawa, Toyohashi (JP);
Naoki Fukusako, Toyohashi (JP);
Masahiro Misu, Nissin (JP); Syogo Yoneda, Toyohashi (JP); Toyohiko Eto, Toyota (JP)

(73) Assignee: Panasonic EV Energy Co., Ltd., Kosai-shi (JP)

( * ) Notice: Subject to any disclaimer, the term of this patent is extended or adjusted under 35 U.S.C. 154(b) by 1048 days.

(21) Appl. No.: 11/866,355

(22) Filed: Oct. 2, 2007

(65) Prior Publication Data

US 2008/0213653 A1  Sep. 4, 2008

(30) Foreign Application Priority Data

Oct. 6, 2006 (JP) ................................ 2006-274808
Jun. 11, 2007 (JP) ................................ 2007-154342

(51) Int. Cl.
*H01M 2/36* (2006.01)
*H01M 2/10* (2006.01)
*H01M 2/12* (2006.01)

(52) U.S. Cl. ............................... 429/72; 429/99; 429/82

(58) Field of Classification Search .................... 429/72, 429/99, 148–149, 151–154, 156, 82; D23/314, D23/324–325; 454/68, 237, 239, 251, 254, 454/261, 269, 69, 75, 83–84, 107–108, 115, 454/143–145, 162; 136/218–220, 222, 223; 165/201, 208, 245, 266–267, 41–42, 44, 165/47, 48.1, 58–59, 61, 75, 120; 320/116, 320/126–132, 135–136, 144
See application file for complete search history.

(56) References Cited

U.S. PATENT DOCUMENTS 5,560,999 A * 10/1996 Pedicini et al. ............... 429/407
(Continued)

FOREIGN PATENT DOCUMENTS

JP 2001-354039 A 12/2001
(Continued)

OTHER PUBLICATIONS

Machine Translation and Abstract in English of JP 2002-219949.*
(Continued)

*Primary Examiner* — Barbara L. Gilliam
*Assistant Examiner* — Claire L Roe
(74) *Attorney, Agent, or Firm* — Christensen O'Connor Johnson Kindness PLLC

(57) ABSTRACT

In a battery pack where a fan is housed within a case housing a battery stack, the noise generated from turbulence of a medium that is supplied and exhausted between a fan opening of the fan and the battery stack is reduced. The battery pack has a battery stack, a cooling fan installed adjacent to the battery stack and having a fan opening formed in a top surface for taking in cooling air after cooling the battery stack, an upper case for covering the upper part of the battery stack and the cooling fan, and a junction duct for guiding the cooling air after cooling the battery stack to the fan opening. The junction duct is formed from the duct lower unit having an opening formed at a location facing the fan opening and one wall of the upper case in contact with a lower end and periphery of the duct lower unit.

3 Claims, 8 Drawing Sheets

U.S. PATENT DOCUMENTS

| | | | |
|---|---|---|---|
| 5,765,743 A * | 6/1998 | Sakiura et al. | 236/49.3 |
| 6,174,231 B1 * | 1/2001 | Bodin | 454/184 |
| 6,242,121 B1 * | 6/2001 | Pedicini et al. | 429/406 |
| 6,498,406 B1 * | 12/2002 | Høriuchi et al. | 307/150 |
| 6,662,891 B2 | 12/2003 | Misu | |
| 6,783,886 B1 * | 8/2004 | Sakakibara et al. | 429/99 |
| 6,895,772 B2 * | 5/2005 | Johnson et al. | 62/314 |
| 7,189,473 B2 * | 3/2007 | Smith et al. | 429/82 |
| 7,199,553 B2 * | 4/2007 | Kimoto | 320/112 |
| 7,312,993 B2 * | 12/2007 | Bundza et al. | 361/696 |
| 2002/0197527 A1 * | 12/2002 | Moores et al. | 429/120 |
| 2004/0232891 A1 * | 11/2004 | Kimoto et al. | 320/150 |

FOREIGN PATENT DOCUMENTS

| | | |
|---|---|---|
| JP | 2002-219949 A | 8/2002 |
| JP | 2002219949 A * | 8/2002 |
| JP | 2005-310461 A | 11/2005 |

OTHER PUBLICATIONS

Notice of Grounds for Rejection mailed Oct. 4, 2011, issued in corresponding Japanese Application No. 2007-154342, filed Jun. 11, 2007, and English translation provided by foreign associate, 6 pages.

* cited by examiner

A-A CROSS SECTION

B-B CROSS SECTION

BATTERY PACK

PRIORITY INFORMATION

This application claims priority to Japanese Patent Applications No. 2006-274808 filed on Oct. 6, 2006 and No. 2007-154342 filed on Jun. 11, 2007, which are incorporated herein by reference in its entirety.

BACKGROUND OF THE INVENTION

1. Field of the Invention

The present invention relates to a battery pack having a battery stack and a fan for supplying and exhausting a medium of the battery stack, and to the configuration of a duct for supplying and exhausting the medium of the battery stack.

2. Description of the Related Art

Heretofore, electric vehicles, hybrid electric vehicles, and fuel cell vehicles were equipped with a battery pack for storing electric power to supply a drive motor.

The battery pack includes a cooling fan for taking in cooling air from the outside for cooling the battery stack configured by combining multiple battery modules.

The battery pack has an upper case for covering the upper part of the battery stack and a lower case for covering the lower part. Built into the battery pack is a battery stack having battery modules formed from one or multiple cells, such as nickel-metal hydride battery or lithium ion battery, having cooling passages located between them in parallel, assembled by binding between end members located at both ends, and having the battery modules electrically connected in series.

FIG. 5 shows an internal configuration of a battery pack 100 of the prior art with its upper case detached. A cooling fan 30 is arranged in line with one end in the longitudinal direction (x direction) of the battery pack 100 within the battery pack 100. Furthermore, a junction duct 200, fabricated from blow-molded plastic, for example, for taking in cooling air from a chamber space formed between the upper part of the battery stack and the upper case is provided on the upper part of a fan opening 32 formed on the top surface of the cooling fan 30.

FIG. 6A is an external perspective view of the junction duct 200. Furthermore, FIG. 6B shows a cross section of the junction duct 200 as viewed from the direction of the arrow along line A-A of FIG. 6A. FIG. 6C shows a cross section of the junction duct 200 as viewed from the direction of the arrow along the line B-B of FIG. 6A. As shown in FIGS. 6B and 6C, two vertical supports 202a, 202b, for example, are formed within the junction duct 200 as reinforcing members preventing deformation of the junction duct 200.

Furthermore, Japanese Patent Laid-Open Publication No. 2001-354039 discloses a battery pack having a blower fan, for taking in cooling air, provided on the outside of a battery case for housing battery cells.

Moreover, Japanese Patent Laid-Open Publication No. 2002-219949 of FIG. 3 discloses a battery pack having a blower fan, for taking in cooling air, provided on the outside of a battery case for housing battery cells. Furthermore, Japanese Patent Laid-Open Publication No. 2002-219949 discloses a configuration where part of an exhaust duct forms a wall of an upper case.

Since the fan opening 32 of the cooling fan 30 and the junction duct 200 are adjacent when the junction duct 200 is provided on the upper part of the fan opening 32 of the cooling fan 30 as described hereinabove, the turbulence from the cooling air generated by rotationally driving the cooling fan 30 reaches the vertical supports 202a, 202b provided inside the junction duct 200 causing the vertical supports 202a, 202b as well as the entire junction duct to vibrate and may generate noise. Furthermore, since the vertical supports 202a, 202b are in the path of the cooling air taken into the cooling fan 30 and obstruct the path of the cooling air, turbulence may occur in the cooling air at the vertical supports 202a, 202b causing the vertical supports 202a, 202b as well as the entire junction duct to vibrate and may generate noise.

SUMMARY OF THE INVENTION

It is therefore an object of the present invention to reduce the noise generated from turbulence of a medium supplied and exhausted to a fan opening in a battery pack where a fan is housed within a case housing a battery stack.

A battery pack includes a battery stack, a fan installed adjacent to the battery stack having a fan opening formed on a top surface for supplying and exhausting a medium of the battery stack, an upper case for covering the battery stack and upper part of the fan, and a junction duct for guiding the supply and exhaust of the medium between the fan opening and the battery stack.

The junction duct includes a duct lower unit having a duct opening formed at a location facing the fan opening provided in a top surface of the fan and one wall of the upper case in contact with a periphery of the duct lower unit at a lower end.

In one aspect of the battery pack relating to the present invention, an exhaust pipe for exhausting gas generated within the battery stack is further included, and at least part of the exhaust pipe and the duct lower unit are integrally constructed.

According to one aspect of the present invention, multiple ribs are formed on the underside of the duct lower unit.

In the present invention, the upper part of the junction duct for guiding the supply and exhaust of medium from the battery stack to the fan opening is configured from the upper case. Thus, for the blow-molded junction duct of the prior art, for example, it becomes unnecessary to provide reinforcing members, such as vertical supports near the fan opening of the fan, and the noise generated from turbulence of a medium that is supplied and exhausted to the fan opening of the fan can be reduced.

DETAILED DESCRIPTION OF THE PREFERRED EMBODIMENTS

A best mode (referred to as the embodiment) for embodying the present invention will be described hereinafter with reference to the attached drawings.

Figure 1:
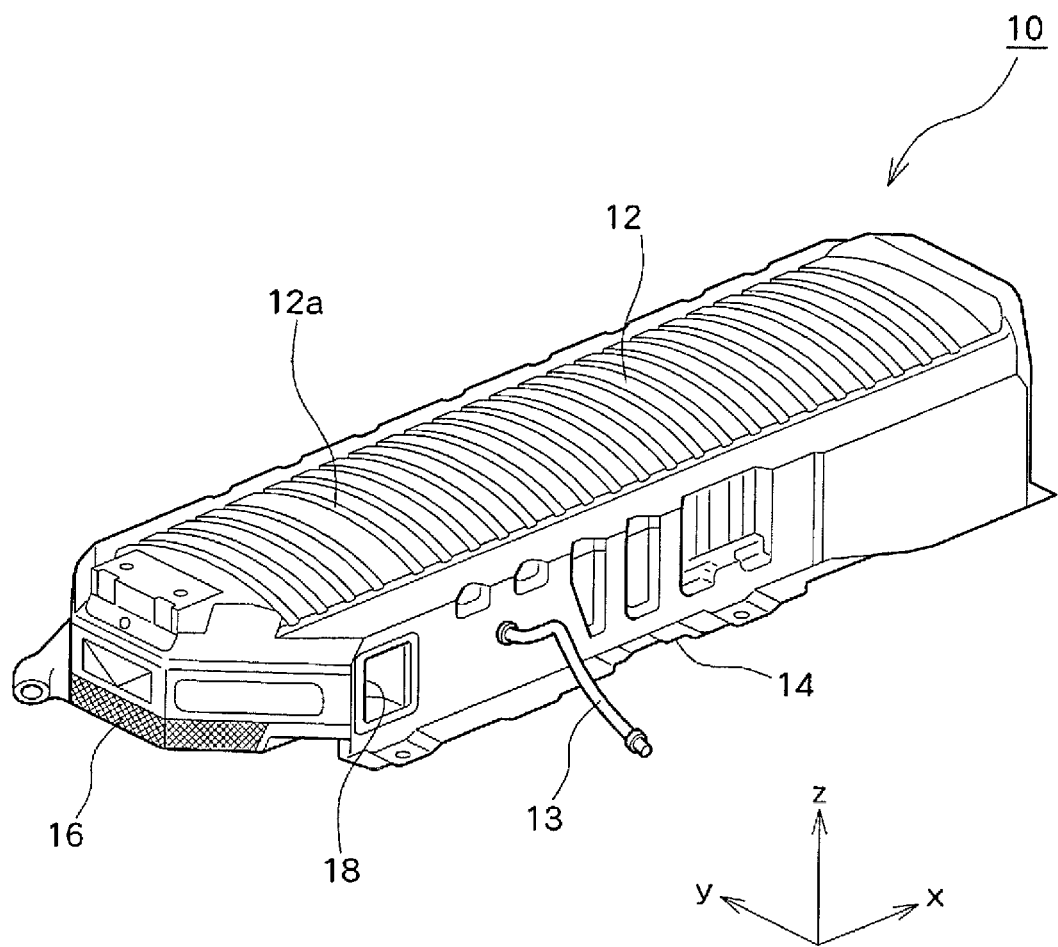
FIG. 1 shows an external perspective view of a battery pack in the embodiment.

FIG. 1 shows an external perspective view of a battery pack 10 in the embodiment. In FIG. 1, a battery case, which is a case for the battery pack 10, has an upper case 12 for covering the upper part of a battery stack and a lower case 14 for covering the lower part. Built into the battery pack 10 is a battery stack having battery modules formed from one or multiple cells, such as nickel-metal hydride battery or lithium ion battery, having cooling passages located between them in parallel, assembled by binding between end members located at both ends, and having the battery modules mutually and electrically connected in parallel. Furthermore, a cooling fan is provided within the battery pack 10 at one end in the longitudinal direction (x direction) of the battery pack 10. An inlet 16 is provided on one side of the battery pack 10 and an outlet 18 is provided on the other side of the battery pack 10 near the cooling fan. When the cooling fan is rotationally driven, air within the passenger compartment is taken in from the air inlet 16. The cooling air that is taken in is supplied to a chamber space formed between the lower part of the battery stack and the lower case 14, flows from the lower part of the battery stack to the upper part via cooling passages provided between battery modules, passes a chamber space formed between the upper part of the battery stack and the upper case 12, and further reaches an exhaust duct via the cooling fan and is exhausted to the outside from the outlet 18. In addition, the battery pack 10 has an exhaust pipe 13 for exhausting to the outside reactant gas that is generated when the battery stack charges or discharges.

The upper case 12 of the battery pack 10 is formed from a non-planar metal plate, such as a steel plate, having a predetermined curvature so as to protrude upward or toward the outer side of the battery pack 10 forming an arch shape or convex shape. Furthermore, a beat part 12a having a groove shape is provided in the upper case 12 so as to protrude toward the inner side of the battery pack. With the longitudinal direction of the battery pack 10 as the x direction, the transverse direction perpendicular to the x direction as the y direction, and the height direction as the z direction as illustrated, the curvature of the upper case 12 is provided in the y-z plane and the beat part 12a is also provided along the y-z plane. When the battery pack 10 is installed in a vehicle so that the longitudinal direction of the battery pack 10 corresponds to the transverse direction of the vehicle, the x direction corresponds to the transverse direction of the vehicle, the y direction corresponds to the lengthwise direction of the vehicle, and the z direction corresponds to the height direction of the vehicle so that the curvature of the upper case 12 is provided in the lengthwise direction of the vehicle. The battery modules are stacked in the longitudinal direction, namely, the x direction, so that the curvature of the upper case 12 is provided in a direction perpendicular to the stacking direction. The rigidity of the battery pack 10 with respect to a load from above can be improved with the arch shape and the beat part 12a.

Figure 2:
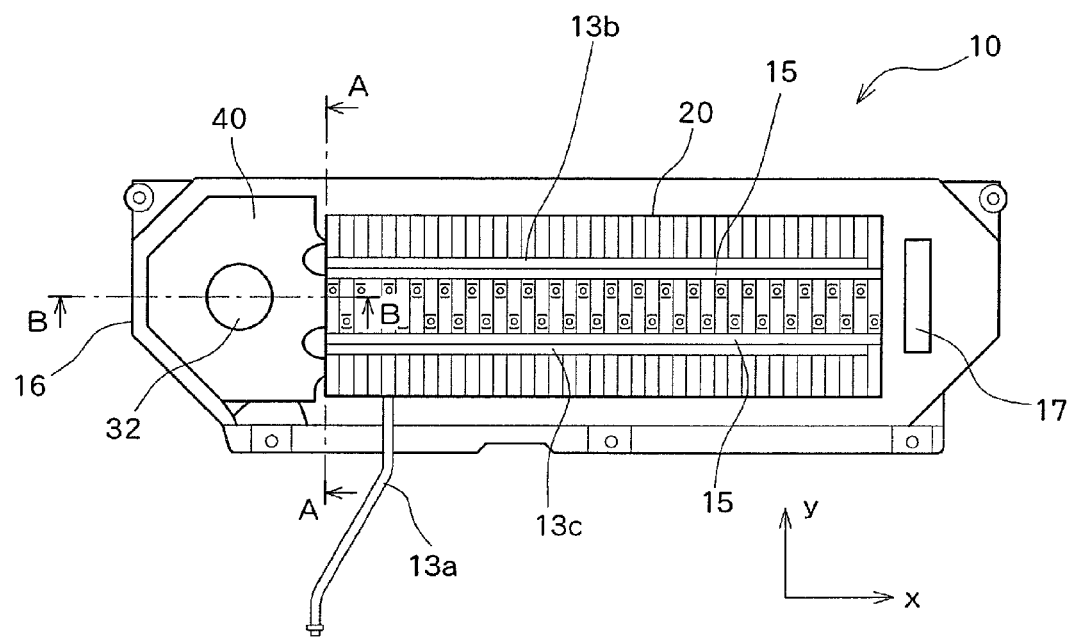
FIG. 2 shows an internal configuration of the battery pack with its upper case detached.

FIG. 2 shows an internal configuration of the battery pack 10 with the upper case 12 detached. A battery stack 20 is configured within the battery pack 10 with multiple battery modules arranged in the longitudinal direction (x direction) of the battery pack 10 and end plates located at both ends bound by a binding rod 15. Furthermore, to the outer side of the binding rod 15 are connected branch pipes 13b, 13c and the branch pipes 13b, 13c are connected to a main pipe 13a. The exhaust pipe 13 is configured from the main pipe 13a and the branch pipes 13b, 13c, and gases generated from each battery module are exhausted to the outside via the branch pipes 13b, 13c and the main pipe 13a. At one end in the x direction of the battery stack 20 is located the cooling fan 30 for supplying cooling air and at the other end is located the control module 17 for controlling charging and discharging of the battery stack. The control module 17 has a microprocessor, performs data communications with a computer installed in the vehicle, and controls the battery stack 20 according to commands from the vehicle computer. A duct lower unit 40 is provided on the upper part of the fan opening 32 formed on the top face of the cooling fan 30. The duct lower unit 40, a pressed plastic member, for example, together with the upper case 12 configure a junction duct for efficiently taking cooling air into the fan opening 32 after cooling the battery stack 20.

Figure 3A:
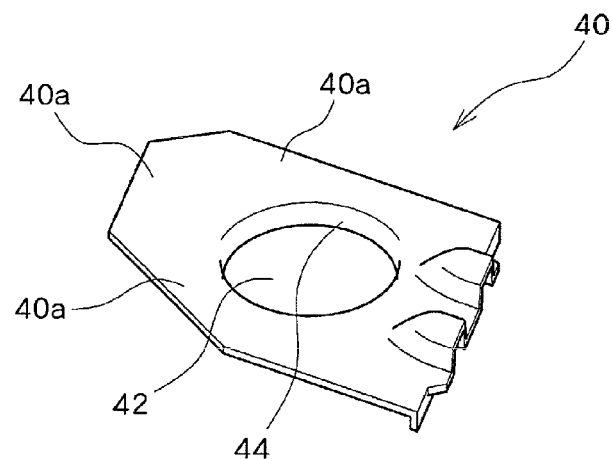
FIG. 3A is an external perspective view of the surface of a duct lower unit.

FIG. 3A is an external perspective view of the duct lower unit 40 relating to the embodiment. As shown in FIG. 3A, the duct lower unit 40 has a generally planar shape with the periphery having a shape cut at an angle to adapt to the shape of the corners of the battery pack 10. A duct opening 42 having a shape to adapt to the fan opening 32 is formed in the general center of the duct lower unit 40. The duct opening 42 extends downward forming an interlocking part 44. The interlocking part 44 and the fan opening 32 interlock with an inner peripheral surface of the interlocking part 44 contacting the peripheral surface of the fan opening 32. Furthermore, compared to the junction duct 200 of the prior art, the duct lower unit 40 has a peripheral part 40a extended in the longitudinal and transverse directions and the peripheral part 40a contacts the lower end of the upper case 12.

Figure 4A:
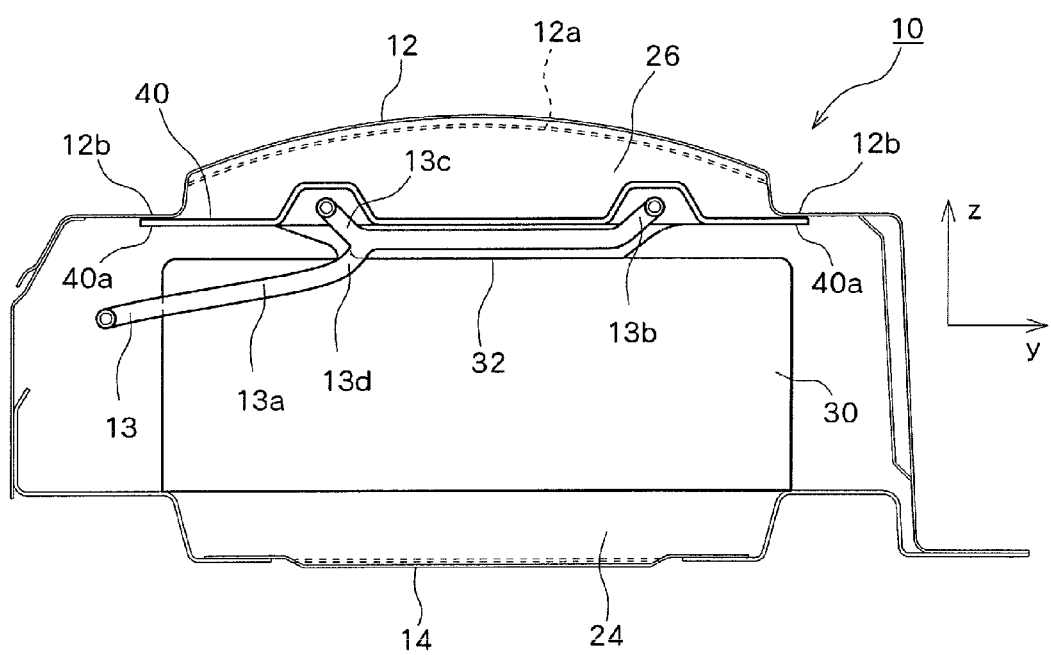
FIG. 4A is a schematic sectional view of the battery pack as viewed from the direction of the arrow along line A-A of FIG. 2.
Figure 4B:
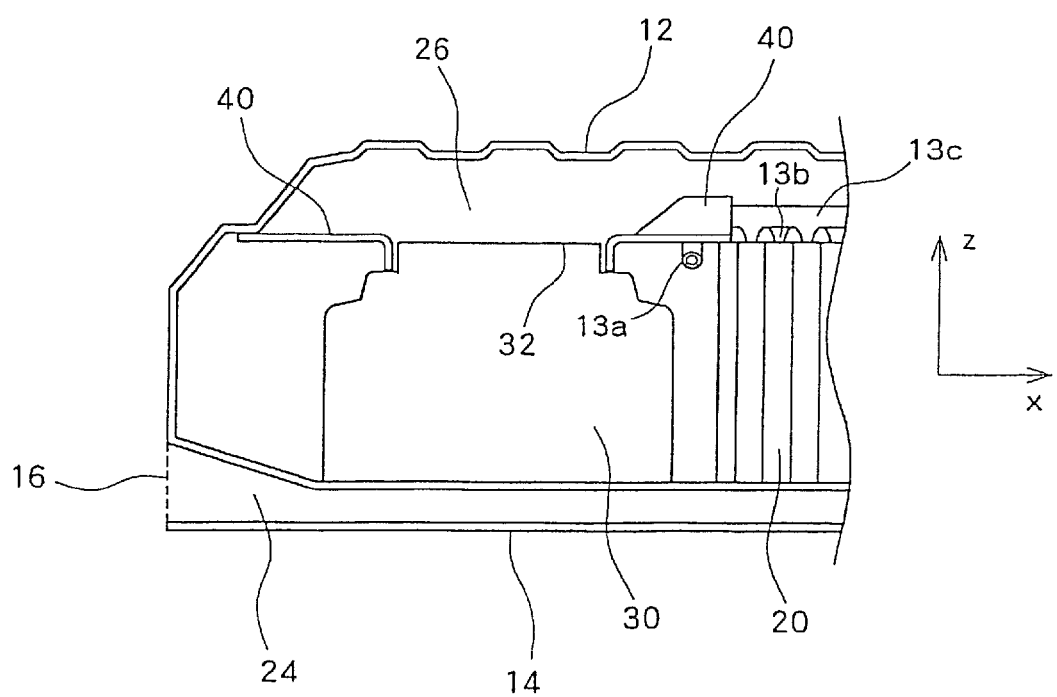
FIG. 4B is a schematic sectional view of the battery pack as viewed from the direction of the arrow along line B-B of FIG. 2.

FIG. 4A shows a cross section of the battery pack 10 as viewed from the direction of the arrow along line A-A of FIG. 2. FIG. 4B shows a simplified cross section of the battery pack 10 as viewed from the direction of the arrow along line B-B of FIG. 2. As shown in FIGS. 4A and 4B, the peripheral part 40a of the duct lower unit 40 contacts the lower end of the upper case 12 and a duct space 26 is formed between the duct lower unit 40 and the upper case 12.

In the battery pack 10 configured in this manner, cooling air is taken in from the passenger compartment by driving the cooling fan 30, supplied to a chamber space 24 formed between the lower part of the battery stack 20 and the lower case 14 via the inlet duct, flows (z direction) from below the battery stack 20 via cooling passages provided between battery modules, and reaches a chamber space 22 formed between the upper part of the battery stack 20 and the upper case 12 to cool the battery stack 20 at the desired cooling characteristics. The cooling air after cooling the battery stack 20 is taken in by the cooling fan 30 from the fan opening 32 via the duct space 26 formed between the duct lower unit 40 and the upper case 12 and the cooling air exhausted from the cooling fan 30 is exhausted from the outlet 18 via the exhaust duct.

Figure 6A:
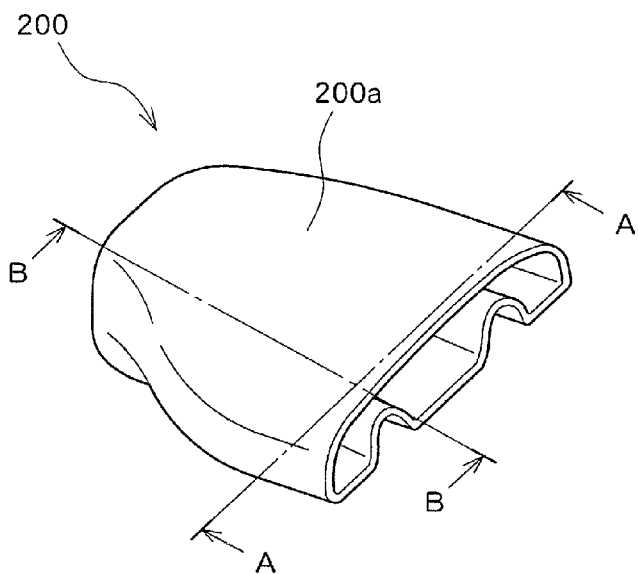
FIG. 6A is an external perspective view of a junction duct of the prior art.
Figure 6B:
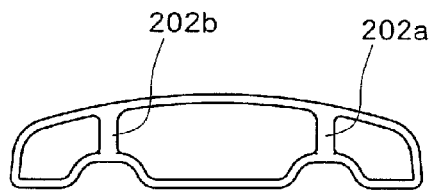
FIG. 6B is a sectional view of the junction duct shown in FIG. 6A as viewed from the direction of the arrow along line A-A of FIG. 6A.
Figure 6C:
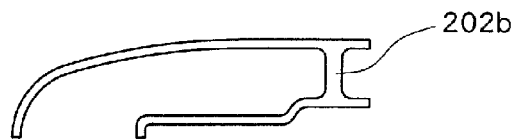
FIG. 6C is a sectional view of the junction duct shown in FIG. 6A as viewed from the direction of the arrow along line B-B of FIG. 6A.

For the cooling air to be efficiently taken into the fan opening 32 in the embodiment, part of the junction duct is formed from the upper case 12. Namely, although the duct space 26 in the junction duct 200 of the prior art shown in FIG. 6 is formed only by the junction duct 200, the duct space 26 in the embodiment is formed by using part of the inner wall of the upper case 12 in addition to the duct lower unit 40. The upper case 12 forms the upper part of the junction duct and the rigidity of the junction duct is ensured by the upper case 12. Thus, the vertical supports 202a, 202b provided near the fan opening 32 in the prior art as reinforcements to improve the rigidity of the junction duct become unnecessary. For this reason, according to the embodiment, the noise that was generated from the existence of the vertical supports 202a, 202b can be reduced. Furthermore, forming the duct space 26 in the inner wall of the upper case 12 enables a larger volume of duct space to be secured and enables the cooling air to be taken into the cooling fan 30 more efficiently compared to the junction duct 200 of the prior art.

The upper case 12 in the aforementioned was described with the part located above the battery stack 20 and the part located above the cooling fan 30 having generally the same shape. However, the upper case 12 may have different shapes for the part located above the battery stack 20 and the part located above the cooling fan 30. Thus, although the aforementioned was described in comparison to the junction duct 200 of the prior art as making it possible to secure a large volume for the duct space, the part located above the cooling fan 30 in the upper case 12 may have a lower contour than the part located above the battery stack 20 and the duct space 26 may have a smaller volume than the duct space of the junction duct 200 of the prior art. As a result, the overall volume of the battery pack 10 can be made compact.

Figure 3B:
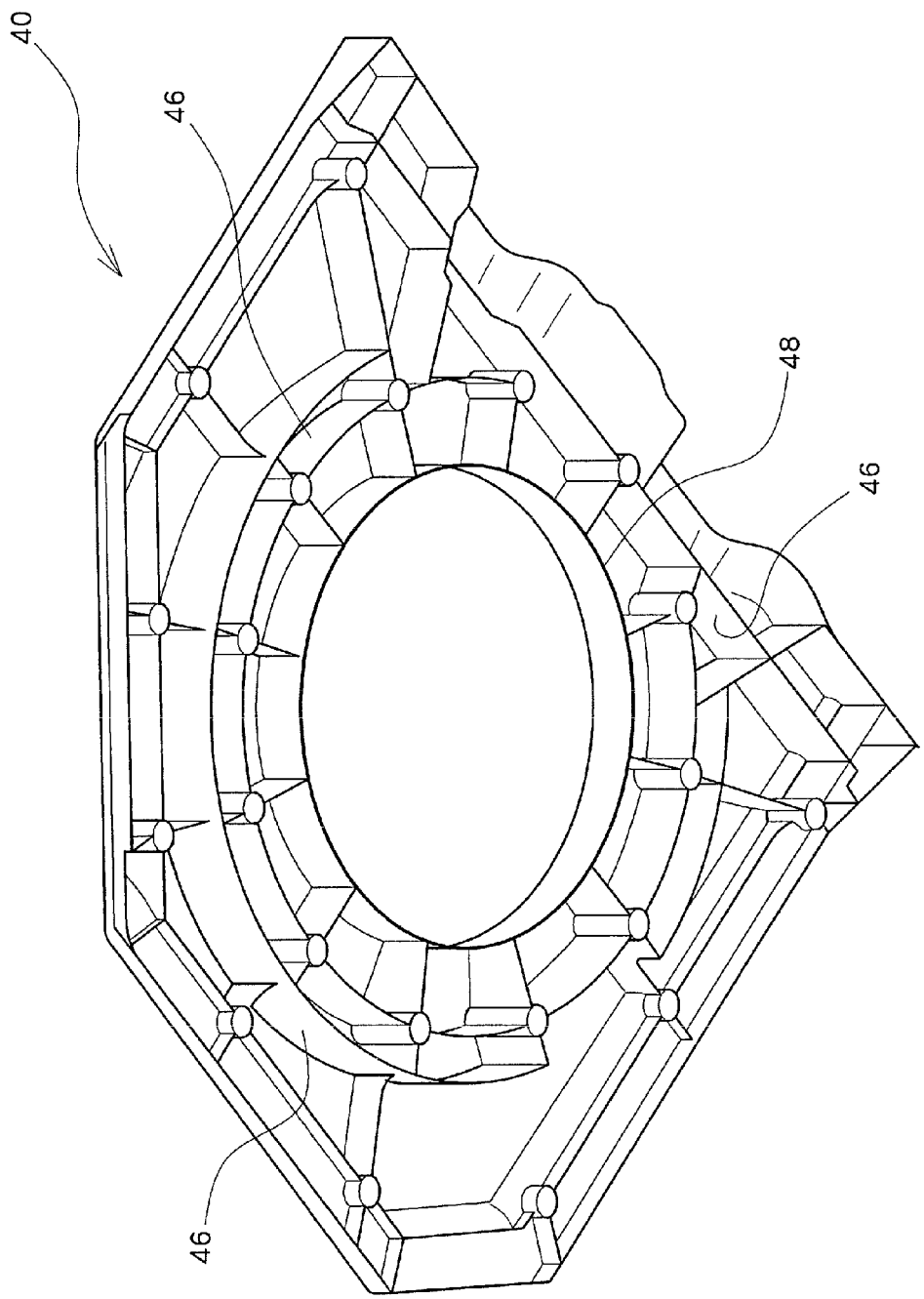
FIG. 3B is an external perspective view of the underside of the duct lower unit.

Furthermore, to improve the rigidity of the duct lower unit 40, multiple ribs 46 may be formed on the underside of the duct lower unit 40 as shown in FIG. 3B. Moreover, to prevent noise from being generated by the cooling fan 30 and the duct lower unit 40 vibrating and striking each other, a part 48 on the underside of the duct lower unit 40 that is in contact with the cooling fan 30 may be provided with a shock absorbing material, such as urethane.

Furthermore, although the embodiment was described with the cooling air after cooling the battery stack 20 being taken in by the cooling fan 30 from the fan opening 32 via the junction duct 200, the embodiment may be configured so that the cooling air exhausted from the fan opening 32 of the cooling fan is sent out to the battery stack 20 via the junction duct 200.

Exhaust holes for exhausting to the outside reactant gas generated from charging or discharging (such as hydrogen gas generated while charging if the battery module is a nickel-metal hydride battery) are formed in the top wall surface of the battery module. The reactant gas that is exhausted from these exhaust holes is exhausted to the outside via the exhaust pipe 13.

As shown in FIG. 4A, the exhaust pipe 13 has a main pipe 13a extending to the outside of the battery pack 10 and an end part 13d on the inner side of the battery pack of the main pipe 13a which branches into a branch pipe 13b and a branch pipe 13c. Among the battery modules arranged in the x direction, the branch pipe 13b is connected to the exhaust hole of each even-numbered battery module as counted from the cooling fan 30. On the other hand, the branch pipe 13c is connected to the exhaust hole of each odd-numbered battery module as counted from the cooling fan 30. Namely, each exhaust hole of each battery module is connected to one of the branch pipes and the branch pipes 13b, 13c join at the branching point 13d and connect to the main pipe 13a. By, configuring the exhaust pipe 13 in this manner, the reactant gas exhausted from the exhaust holes is exhausted to the outside via exhaust pipe 13b or exhaust pipe 13c and main exhaust 13a.

Figure 4C:
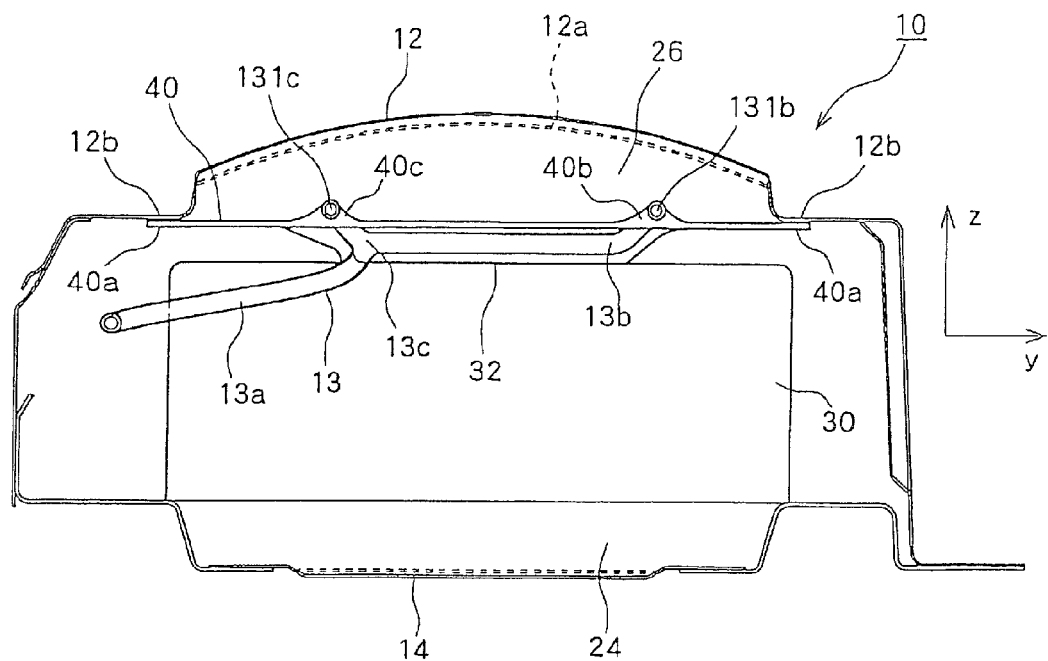
FIG. 4C is a schematic sectional view of the battery pack as viewed from the direction of the arrow along line A-A of FIG. 2 when the duct lower unit and the exhaust piping are integrated.
Figure 4D:
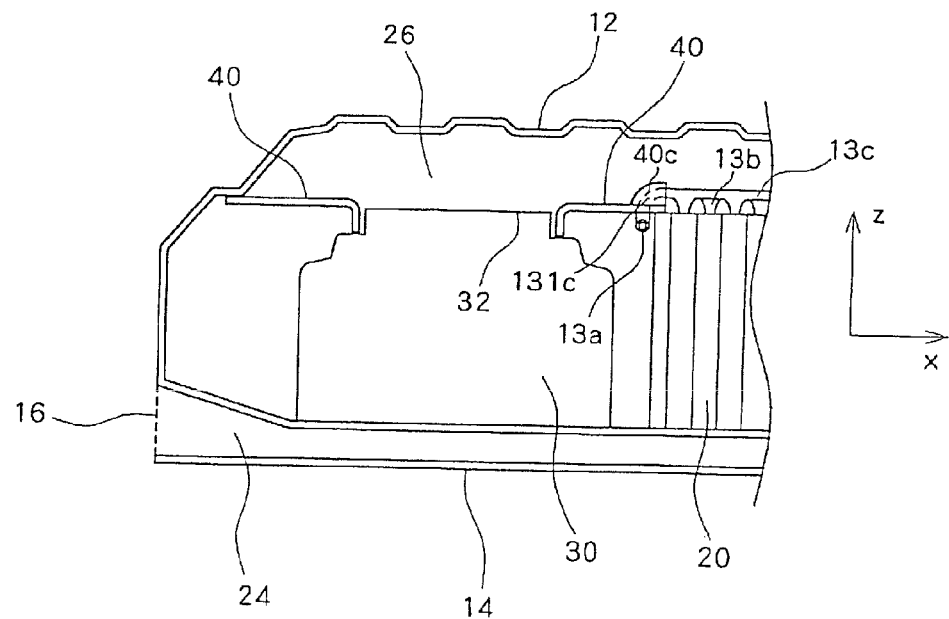
FIG. 4D is a schematic sectional view of the battery pack as viewed from the direction of the arrow along line B-B of FIG. 2 when the duct lower unit and the exhaust piping are integrated.
Figure 5:
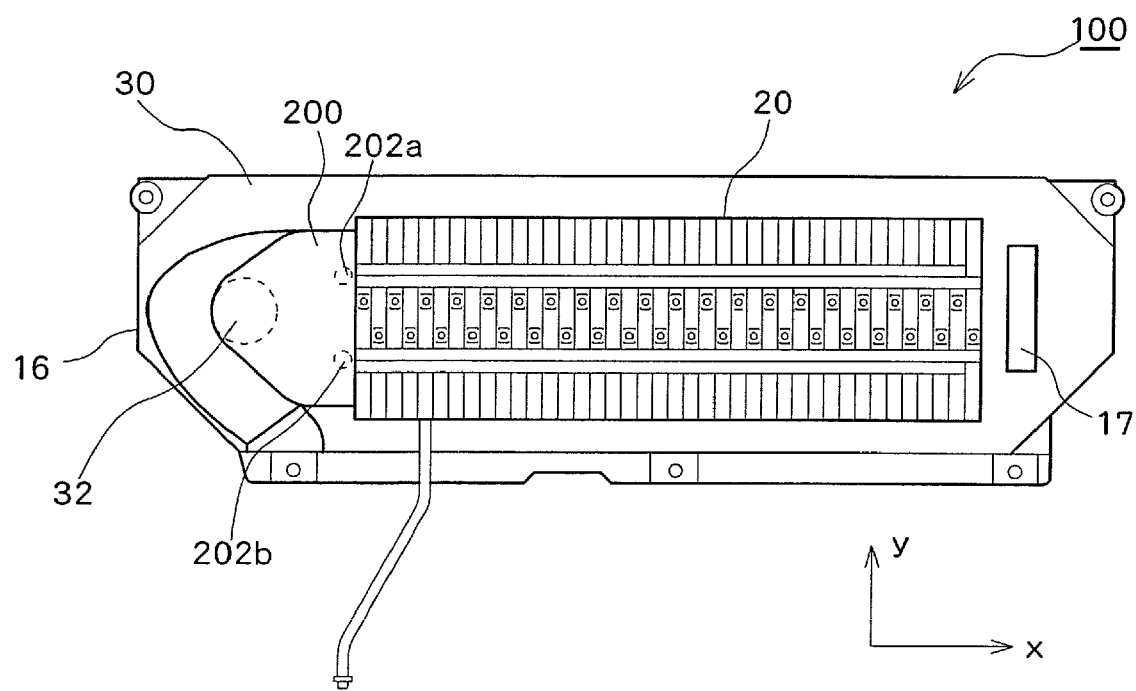
FIG. 5 shows an internal configuration of a battery pack of the prior art with an upper case detached.

The exhaust pipe 13 was described above in an example as being configured independently from other members. However, the duct lower unit 40 and the exhaust pipe 13 may be integrally configured. More specifically, for example, as shown in FIGS. 4C and 4D, a portion of the branching point 13d of the branch pipes 13b, 13c and the duct lower unit 40 may be integrally configured. In other words, protruding parts 40b, 40c are formed to protrude upward at locations corresponding to the branch pipe 13b and branch pipe 13c at the periphery on the battery stack 20 side of the duct lower unit 40. In each protruding part 40b, 40c is formed a through hole 131b, 131c, respectively, where the hole is formed to open toward the battery stack 20 in the x direction and each hole connects to the respective hole formed on the underside of the duct lower unit 40. These through holes 131b, 131c may be configured as part of the branch pipes 13b, 13c.

As described above, integrally configuring the duct lower unit 40 and the exhaust pipe 13 eliminates space between the duct lower unit 40 and the exhaust pipe 13 and improves the sealing property of the duct space 26 that is formed between the duct lower unit 40 and the upper case 12. Thus, the cooling air after cooling the battery stack 20 can be sent to the fan opening 32 via the duct space 26 more efficiently than in a configuration where the duct lower unit 40 and the exhaust pipe 13 are discrete parts. Furthermore, integrally configuring the duct lower unit 40 and the exhaust pipe 13 can further reduce the vibration of the duct lower unit 40 since the duct lower unit 40 is fixed to one side of the upper case 12 via the main pipe 13a, which forms part of the exhaust pipe 13. Moreover, integrally configuring the duct lower unit 40 and the exhaust pipe 13 can reduce the number of parts and can reduce the number of steps for assembling the battery pack. In addition, a large duct space can be ensured compared to when the duct lower unit 40 and the exhaust pipe 13 are configured separately. Or, for example, with the part located above the cooling fan 30 of the upper case 12 having a lower contour than the part located above the battery stack 20, the duct space 26 may have a smaller volume compared to when the duct lower unit 40 and the exhaust pipe 13 are configured separately. As a result, the overall volume of the battery pack 10 can be made compact.

At least part of the exhaust pipe 13 and the duct lower unit 40 may be integrally configured from common plastic molding techniques, such as vacuum molding, pressure forming, or press forming.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A battery pack comprising:
    a lower case having a longitudinal direction;
    a battery stack supported on said lower case and arranged longitudinally thereon, wherein said battery stack has two longitudinal ends;
    a fan supported on said lower case and disposed adjacent to said battery stack on one longitudinal end of said battery stack, said fan having a fan opening for supplying and exhausting a medium of said battery stack;
    an upper case configured to cover said battery stack and fan, wherein said upper case joins with said lower case to enclose said battery stack and fan, and wherein a chamber space is formed between said upper case and said battery stack; and a junction duct for guiding supply and exhaust of said medium between said fan opening and said chamber space;

said junction duct comprises a duct lower unit having a duct opening formed at a location facing said fan opening and a periphery of said duct lower unit extends to contact said upper case, wherein said duct lower unit periphery extends transversely to a width of said upper case and extends longitudinally from one of said longitudinal ends of said battery stack to an end of said upper case such that a duct space is formed between said duct lower unit and said upper case, and said duct space is connected to said chamber space.

2. A battery pack according to claim 1 further comprising an exhaust pipe for exhausting gas generated within said battery stack;

at least part of said exhaust pipe and said duct lower unit are integrally constructed.

3. A battery pack according to claim 1, wherein:

a plurality of ribs are formed on said duct lower unit on a side facing said fan.

\* \* \* \* \*